No. 614,846. Patented Nov. 29, 1898.
G. A. DIBBELL.
ROTARY ENGINE.
(Application filed Aug. 10, 1897.)
(No Model.) 3 Sheets—Sheet 3.
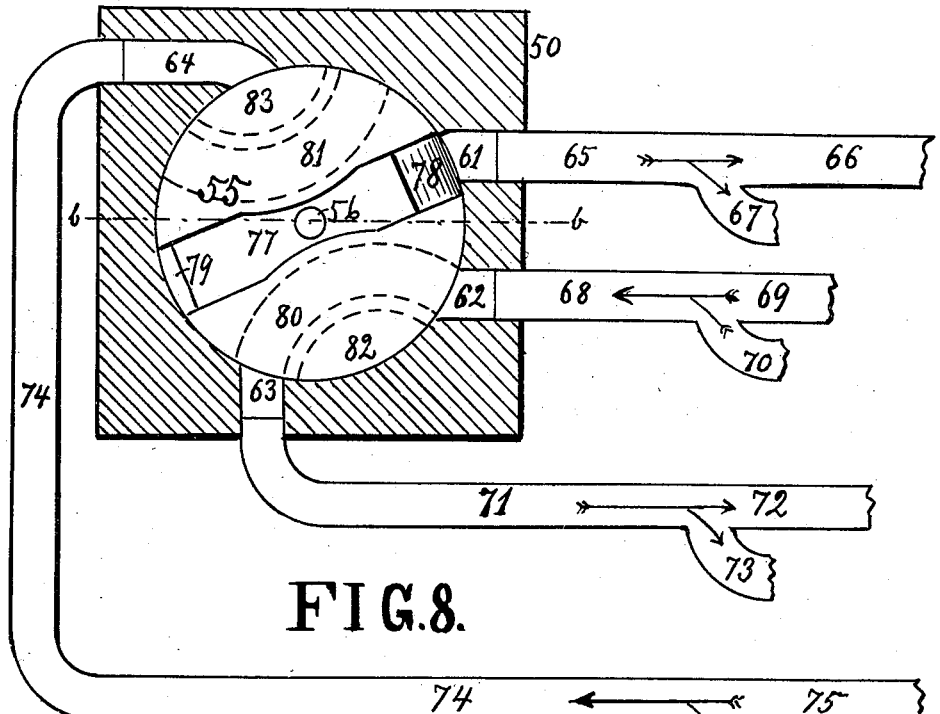
FIG. 8.
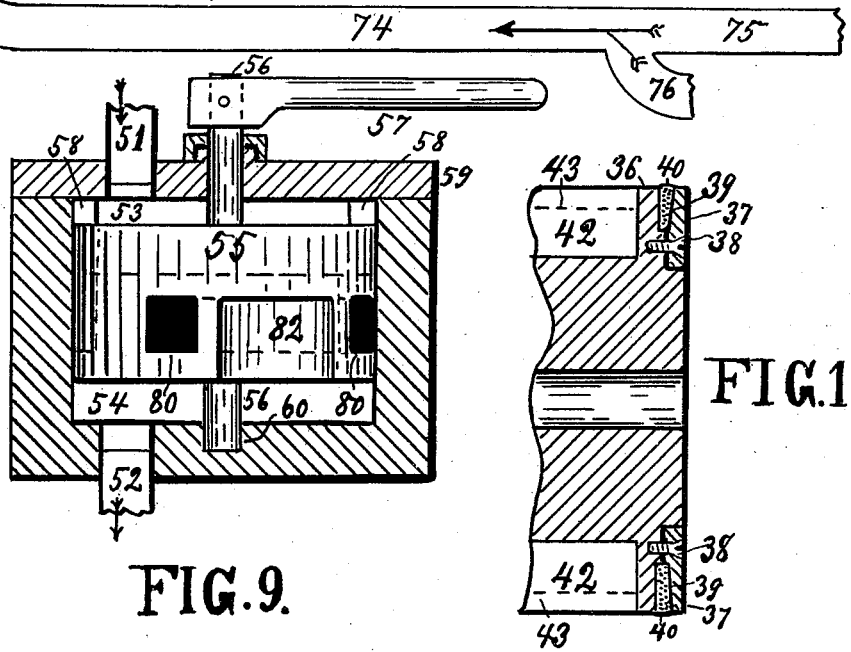
FIG. 9.
FIG. 10.
WITNESSES:
D. E. Carlsen
E. C. Carlsen
INVENTOR:
George A. Dibbell
BY his ATTORNEY.
A. M. Carlsen.

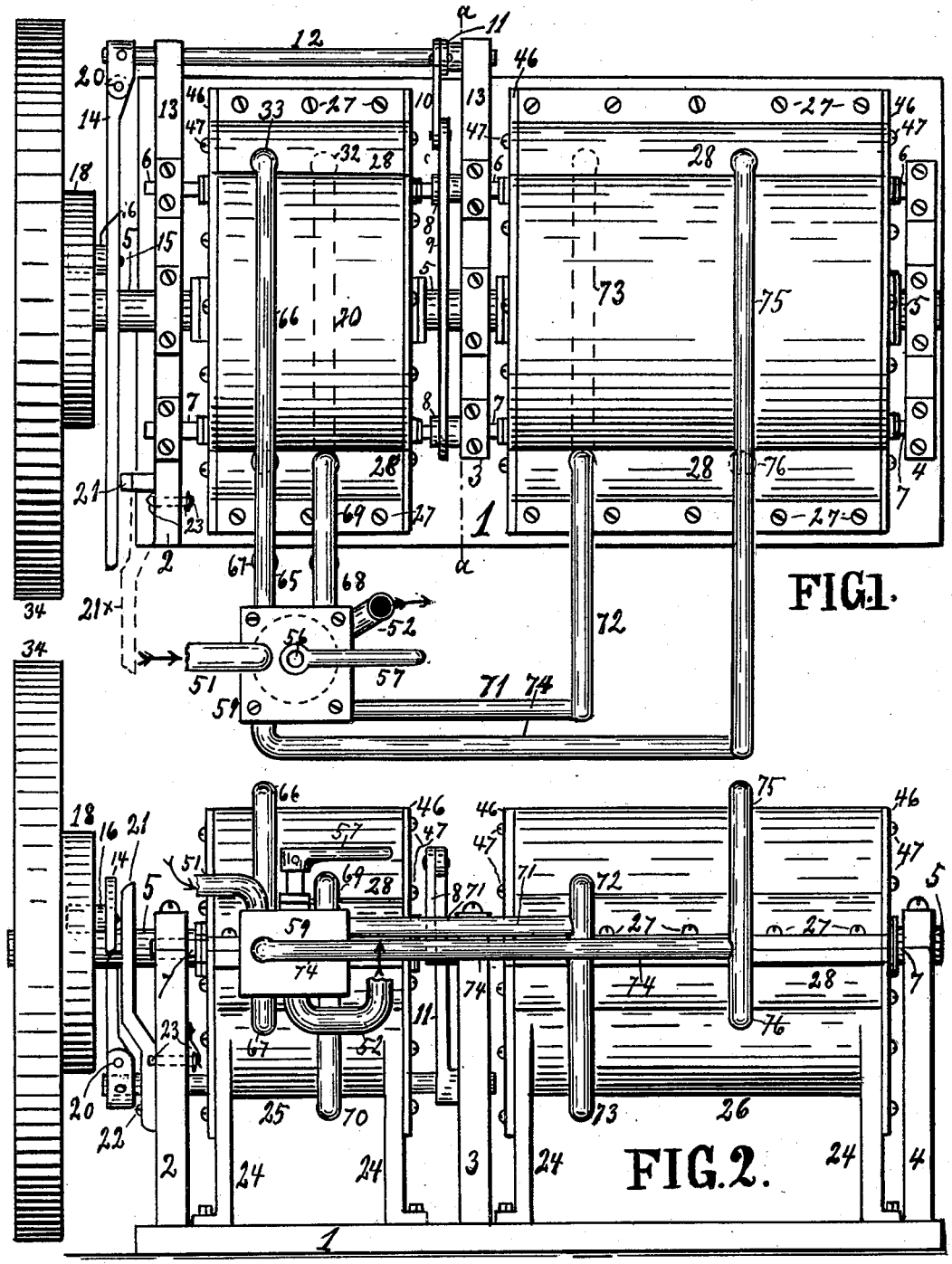

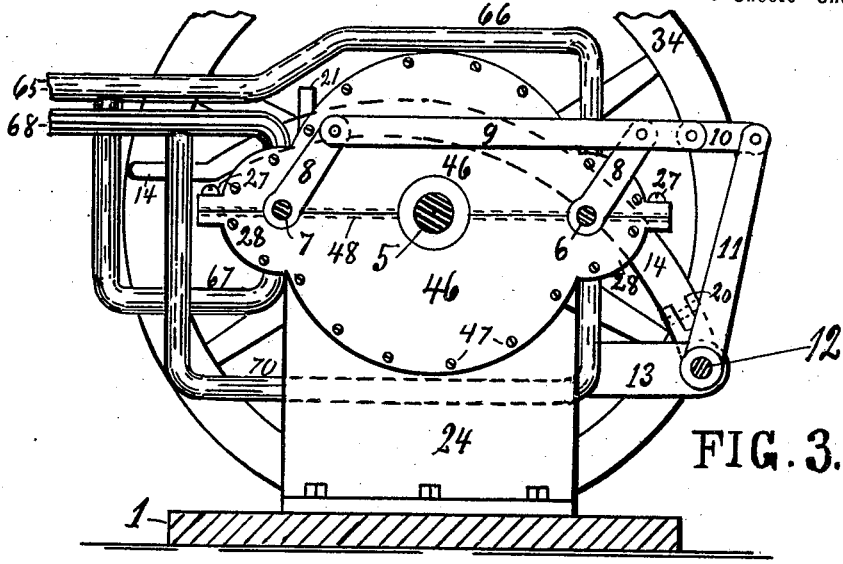

UNITED STATES PATENT OFFICE.

GEORGE A. DIBBELL, OF WASHBURN, WISCONSIN.

ROTARY ENGINE.

SPECIFICATION forming part of Letters Patent No. 614,846, dated November 29, 1898.

Application filed August 10, 1897. Serial No. 647,761. (No model.)

*To all whom it may concern:*

Be it known that I, GEORGE A. DIBBELL, a citizen of the United States, residing at Washburn, in the county of Bayfield and State of Wisconsin, have invented certain new and useful Improvements in Rotary Engines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rotary steam-engines; and the objects of my invention are, first, to provide a rotary engine with fixed wings upon the sides of the piston and thus overcome the great wear by friction of the sliding wings ordinarily used in the pistons of rotary engines; second, to provide a rotary engine in which the packing of the piston-head and piston-wings may easily be reached and kept in repair; third, to provide a compound rotary engine with a single valve for starting, stopping, and reversing the engine and conducting the steam properly to and from the two cylinders; fourth, to provide a rotary engine in which the steam-pressure is equalized upon opposite sides of the piston head and shaft.

These and other objects I attain by the novel construction and arrangements of parts illustrated in the accompanying drawings, in which—

Figure 1 is a top view of my complete engine. Fig. 2 is a side elevation of Fig. 1. Fig. 3 is a cross-section as on the line $a\,a$ in Fig. 1, looking from right to left. Fig. 4 is a cross-section of one of the cylinders with the piston and valves belonging therein. Fig. 5 is a face view of the cam operating the valves. Fig. 6 is an end view of the piston. Fig. 7 is a side view of the piston with one of the valves in its place. Fig. 8 is an enlarged top view of the plug of the reversing-valve and the shell of the valve intersected on a line passing through all of its side ports and the steam-pipes connected with the ports, shown in outline and slightly turned, so as to show their branching off toward the ports of the cylinders. Fig. 9 is a vertical central section of the valve-shell as on the line $b\,b$ in Fig. 8, exposing the side of the valve-plug; and Fig. 10 is an enlarged central longitudinal section of an end portion of the piston as on the line $c\,c$ in Fig. 6.

Referring to the various parts in the drawings by reference-numerals, 1 designates the bed-plate of the engine. From this project upward the stands 2 3 4, in the top of which are journaled the main shaft 5 of the engine and some distance away to both sides therefrom the two rock-shafts 6 and 7, upon each of which is secured a rocker-arm 8, which is pivotally connected to the horizontal rocker-rod 9, one end of which is connected by the link 10 to the rocker-arm 11, secured on one end of the rock-shaft 12, journaled in the arms 13, projecting out from the stands 2 and 3, as best shown in Figs. 1 and 3. To the other end of said rock-shaft 12 I secure the lever 14, which on the stud 15 carries the roller 16, normally engaging the groove 17 (best shown in Fig. 5) in the cam 18, secured upon the main shaft 5. Said groove imparts by its oppositely-located curves 19 two full rocking motions to the lever 14 and shafts 12 and 16 for each revolution of the main shaft 5.

20 is a joint on the lever 14 to allow the lever to be swung horizontally out of engagement with the cam 18 when so desired, for a purpose presently to be described.

21 is a guide swinging on its pivot 22, so that it may be folded down, as shown in dotted line $21^\times$ in Fig. 1, or retained by the spring-pressed locking-pin 23 in the upright position, in which it serves to keep the lever 14, with its roller 16, in the groove of the cam 18.

Between the stands 2 and 3 and 3 and 4 I mount on the legs 24 the small or high-pressure cylinder 25 and the larger or low-pressure cylinder 26, the construction of which is exactly alike, except as to their size, which is different as to length, but not as to diameter. The following description of one of the cylinders therefore answers for both of them: The cylinder, which may preferably be made in an upper and a lower half and secured together by the screws 27, is provided with two oppositely-located valve-chambers 28, (see Fig. 4,) opening sidewise into the cylinder and housing the valve-plugs 29, secured on the rock-shafts 6 and 7 and provided with the opposite side grooves 30 31, by which to receive and admit steam to and from the cylinder to or from the ports 32 and 33, according to which way the engine is run.

Upon the main shaft 5, on which the flywheel 34 is secured, I secure within the steam-cylinder the piston or piston-head 35, which consists of a cylindrical body placed centrally in the cylinder and provided at the ends with flanges 36, between which and the packing-rings 37, held by the screws 38, are inlaid in V-shaped grooves 39 the flexible packing 40, which touches against the cylinder and may be adjusted thereto by tightening the screws 38, and thus squeeze the packing outward. Between the two end flanges 36 of the piston-head extend two diametrically opposite wings or pistons proper, 41 and 42, in the edges of which are secured the packing-strips 43. When the piston-head revolves, these wings 41 pass into and out of the longitudinal grooves 44 in the valve-plugs 29 during the rocking motion of the valve. These grooves 44 are as long as the valve-plug, and thus fill between the flanges 36 of the piston-head, as best shown in Fig. 7, while the grooves 30 31 need not extend to the ends of the plug. 45 are adjustable packings provided at the edges of the valve-plugs to make them steam-tight against the piston-head 35 as well as against the valve-shell.

Besides the packings 40 at the ends of the piston-head the escape of steam is further guarded against by the cylinder-heads 46, secured to the cylinder by the screws 47, and being parted diametrically in two, with a packing-strip 48 (see dotted lines in Fig. 3) laid in grooves in the adjoining edges, admits of removal of the upper half of the head when it is necessary to reach the screws 38 in the piston-head for adjustment of the packing 40. For repair of the packings 43 and 44 the upper half of the cylinder may be removed.

The valve by which the engine is started, stopped, and reversed consists of the shell 50, having the steam-inlet pipe 51 at its top and the exhaust-pipe 52 at its bottom. Said pipes may, if preferred, enter horizontally into the steam-spaces 53 and 54 at the top and bottom of the valve-plug 55, of which 56 is the stem and 57 the operating handle or lever.

58 are lugs at the under side of the cover 59 of the valve-shell for keeping the plug down with the bottom end of its stem in the step 60, which, being small, allows the plug to be turned easily, although there is steam-pressure on the top of it. The shell of the valve is further provided with four side ports 61 62 63 64, of which the port 61 is connected by the branching pipes 65 66 67 with the ports 33 of the valve-chambers 28 on the high-pressure cylinder 25, and the port 62 communicates with the ports 32 in said valve-chambers 28 through the branching pipes 68 69 70, and the ports 63 and 64 are connected in like manner, as just described, with the corresponding ports of the valve-chambers of the large or low-pressure cylinder 26 by the pipes 71 72 73 and 74 75 76.

The valve-plug 55 is provided in its top with a diametrical groove 77, sunk down at the end 78, so as to reach the ports 61 and 62, and at the other end so as to form a counterbalancing steam-space 79 opposite the space 78. Some distance down on the plug 55 I provide in opposite sides of it the segmentally-curved transverse steam-ducts 80 81, beyond which are again provided the segmental longitudinal grooves 82 83, which are permanently open into the steam-space 54 of the valve, but in upward direction extend only to the top of the ports 63 64, from which they receive the exhaust-steam from the large cylinder.

In operation if the valve-plug 55 be turned as shown in Fig. 8, with the mouth 78 facing the port 61, the live steam will rush into the small cylinder 25 through the pipes 65 66 67, and after imparting half a turn to the piston it is shut off by the valve and by the next wing of the piston emerging from the valve 29, behind it, and is then conducted through the pipes 70 69 68, port 62, duct 80, port 63, and pipes 71 72 73 into the large cylinder 26, where it expands to about twice its bulk, revolves the large piston in the same direction as the small one, and then returns through the pipes 76 75 74, port 64, duct 83, space 54, and exhausts at 52, and if the engine is to be stopped the valve-plug 55 needs simply be turned with its mouth 78 between the two ports 61 and 62, and if the engine is to be reversed the mouth 78 is turned to meet the port 62, which will direct the live steam through the pipes 62 68 69 70 into the small cylinder at the opposite side of the wings 41 42 and to return through the pipes or ways 67 66 65 61 81 64 74 75 76 into the large cylinder, from which it will then exhaust through the pipes or ways 73 72 71 63 82 54 52.

As the diameters of the two cylinders are the same, the length of the large cylinder determines the amount of expansion. The use of a condenser being common for compound engines, I need not describe it or its connection with my engine; but the exact operation of the valves and the piston (best shown in Fig. 4) may need further explanation. Therefore I will add that when the piston and wings 41 42 stand in the position shown the upper edge or wing of the valve 29 and the lower edge of the valve $29^\times$ have just closed after the steam escapes from both the upper and the lower half of the cylinder and with their other edges opened for new live steam to enter the spaces 30 and press upon both wings of the piston in the direction of the arrow until the wings reach the positions shown in dotted lines. Then the valves turn quickly to let the wings pass to the position shown in solid lines. While the wings make that motion, the used steam exhausts or passes out through the ports 33 and the valves resume the position shown, closing tightly against the body of the piston, and thus allow fresh steam to enter the spaces 30 and turn the piston. The quick motion of the valves is caused by the sharp curves 19 of the cam 18, which causes all the rocking motion to the valves. While the wings move forward from their solid to their dotted positions, the valves 29 and 29× stand still, and while the wings pass the valves the valve 29 turns as much downward as the valve 29×, and the latter turns upward like valve 29. When the valves 29 are properly constructed, they will shut off the live steam from the cylinder while the wings of the piston pass the valves, and consequently a very tight fit of the wings into the grooves of the valves is not important. Should the engine happen to stop with the wings in the middle of the grooves 44, it will be on a kind of "dead-center," but it may be easily started by swinging the lever 14, with its roller 16, out of contact with the cam and raise or lower it, so as to rock the valve-plugs 29 and 29× sufficiently to let in steam either through the ports 32 30 or 33 31 to turn the piston and then drop the lever 14, with its roller 16, into the cam again and throw the guide 21 in front of it.

Having thus described my invention, what I claim, and desire to secure by Letters Patent, is—

1. In a rotary engine and mounted in a suitable frame, the combination of the cylinder 23, having the oppositely-located cylindrical chambers 28, provided with the steam-ports 32, and 33, about opposite each other, the valve-plugs 29, and 29×, rocking therein, extending sidewise into the cylinder and being provided with the two opposite grooves 30, 31, adapted to set the ports 32, and 33, in communication with the cylinder, and having between said grooves 30, and 31, the side groove 44, serving as escapes for the wings of the piston; the piston 35, having a smooth cylindrical body adapted to fit against the edges of the rocking valves and having the diametrically opposite wings 41, 42, with the packing 43, at their edges and the circular end flanges 36, provided with the packings 40, fitting in the ends of the cylinder, the main shaft 5, secured in the piston, extending beyond the cylinder and having secured upon it a fly-wheel and a double-acting cam, the lever 14, operated by said cam and having the joint 20, the guide 21, the rock-shaft 12, and rocker-arm 11, operated thereby, and the two rocker-arms 8, secured upon the stems of the valve-plugs, 29, 29×, and the rod 9, and link 10, connecting the arms 8, together and to the rocker-arm 11; and means for conducting the steam to and from the valve-chambers, substantially as and for the purpose set forth.

2. In a rotary engine and mounted in a suitable frame, the combination of the cylinder 23, having the oppositely-located cylindrical chambers 28, provided with the steam-ports 32, and 33, about opposite each other, the valve-plugs 29 and 29×, rocking therein, extending sidewise into the cylinder and being provided with the two opposite grooves 30, 31, adapted to set the ports 32, and 33, in communication with the cylinder and having between said grooves 30, and 31, the side groove 44, serving as escapes for the wings of the piston; the piston 35, having a smooth cylindrical body adapted to fit against the edges of the rocking valves and having the diametrically opposite wings 41, 42, with the packing 43, at their edges and the circular end flanges 36, provided with the packing 40, fitting in the ends of the cylinder; the main shaft 5, secured in the piston, extending beyond the cylinder and having secured upon it a fly-wheel and a double-acting cam, the lever 14, having the joint 20, the guide 21, the rock-shaft 12, and rocker-arm 11, operated thereby, and the two rocker-arms 8, secured upon the stems of the valve-plugs 29, 29×, and the rod 9, and link 10, connecting the arms 8, together and to the rocker-arm 11, and means for conducting the steam to and from the valve-chambers, said cylinder and valve-chambers being parted diametrically in two and bolted or screwed together, substantially as and for the purposes set forth.

3. In a rotary engine and mounted in a suitable frame, the combination of the cylinder 23, having the oppositely-located cylindrical chambers 28, provided with the steam-ports 32, and 33, about opposite each other, the valve-plugs 29, and 29×, rocking therein, extending sidewise into the cylinder and being provided with the two opposite grooves 30, 31, adapted to set the ports 32, and 33, in communication with the cylinder and having between said grooves 30, and 31, the side groove 44, serving as escapes for the wings of the piston; the piston 35, having a smooth cylindrical body adapted to fit against the edges of the rocking valves and having the diametrically opposite wings 41, 42, with the packing 43, at their edges and the circular end flanges 36, provided with the packing 40, fitting in the ends of the cylinder; the main shaft 5, secured in the piston, extending beyond the cylinder and having secured upon it a fly-wheel and a double-acting cam, the lever 14, having the joint 20, the guide 21, the rock-shaft 12, and rocker-arm 11, operated thereby, and the two rocker-arms 8, secured upon the stems of the valve-plugs 29, 29×, and the rod 9, and link 10, connecting the arms 8, together and to the rocker-arm 11, and means for conducting the steam to and from the valve-chambers, said cylinder being provided with covers having stuffing-boxes for the shaft 5, and the valve-stems 6 and 7, said cylinder valve chambers and covers being split or parted diametrically, substantially as and for the purpose set forth.

In testimony whereof I affix my signature in presence of two witnesses.

GEORGE A. DIBBELL.

Witnesses:
D. L. MONTGOMERY,
CHRIS. L. BUCK.